(12) United States Patent
Kunai (10) Patent No.: US 9,128,247 B2
(45) Date of Patent: Sep. 8, 2015

(54) PRODUCTION METHOD OF LAYERED FILM, PRODUCTION METHOD OF POLARIZING LAYERED FILM AND PRODUCTION METHOD OF POLARIZING PLATE

(75) Inventor: Yuichiro Kunai, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 207 days.

(21) Appl. No.: 13/638,459

(22) PCT Filed: Mar. 28, 2011

(86) PCT No.: PCT/JP2011/058471
§ 371 (c)(1),
(2), (4) Date: Nov. 8, 2012

(87) PCT Pub. No.: WO2011/125957
PCT Pub. Date: Oct. 13, 2011

(65) Prior Publication Data
US 2013/0220525 A1 Aug. 29, 2013

(30) Foreign Application Priority Data
Mar. 31, 2010 (JP) ................................ 2010-081759

(51) Int. Cl.
*B05D 5/00* (2006.01)
*G02B 1/10* (2006.01)
(Continued)

(52) U.S. Cl.
CPC .......... *G02B 5/3033* (2013.01); *B29D 11/0073* (2013.01); *B29D 11/00644* (2013.01); *G02F 1/133528* (2013.01)

(58) Field of Classification Search
CPC ..................... B32B 2307/42; G02F 1/133528; G02C 5/3025; G02B 5/3033; G02B 5/3041; G02B 5/305
USPC ......... 427/162–169, 264, 271, 272, 282, 289; 156/229; 349/96
See application file for complete search history.

(56) References Cited

U.S. PATENT DOCUMENTS

| | | | |
|---|---|---|---|
| 4,659,523 A | 4/1987 | Rogers et al. | |
| 6,171,426 B1 * | 1/2001 | Blanchard | ..................... 156/203 |

(Continued)

FOREIGN PATENT DOCUMENTS

| | | |
|---|---|---|
| JP | 01-240517 A | 9/1989 |
| JP | 03-014882 A | 1/1991 |

(Continued)

OTHER PUBLICATIONS
International Search Report, PCT/JP2011/058471, 2 Pages.
(Continued)

*Primary Examiner* — Carson Gross
(74) *Attorney, Agent, or Firm* — Hogan Lovells US LLP (57) ABSTRACT

Provided are a method of producing a layered film, the method comprising a resin layer formation step (S10) consisting of a coating step of applying a solution containing a polyvinyl alcohol resin onto one surface of a base material film to form a resin coated layer, and a drying step of drying the above-described resin coated layer to form a resin layer, wherein in the above-described coating step, un-coated portions on which the above-described solution is not applied are formed in regions each being 0.5 cm or more separated inward from each of the above-described base material film's edges opposing each other along the width direction, a method of producing a polarizing layered film using the layered film, and a method of producing a polarizing plate using the polarizing layered film. According to the present invention, a method of producing a polarizing plate with good productivity while preventing a warping phenomenon is provided.

16 Claims, 3 Drawing Sheets

(51) Int. Cl.
*G02B 5/30* (2006.01)
*B29D 11/00* (2006.01)
*G02F 1/1335* (2006.01)

(56) References Cited

U.S. PATENT DOCUMENTS

| | | |
|---|---|---|
| 2007/0165157 A1 | 7/2007 | Hong |
| 2008/0192345 A1 | 8/2008 | Mochizuki et al. |
| 2010/0202051 A1 | 8/2010 | Yoshimi et al. |

FOREIGN PATENT DOCUMENTS

| | | |
|---|---|---|
| JP | 03-122137 A | 5/1991 |
| JP | 05-031424 A | 2/1993 |
| JP | 07-171459 A | 7/1995 |
| JP | 08-084953 A | 4/1996 |
| JP | 2000-338329 A | 12/2000 |
| JP | 2003-043257 A | 2/2003 |
| JP | 2005-034681 A | 2/2005 |
| JP | 2005-111669 A | 4/2005 |
| JP | 2009-093074 A | 4/2009 |
| JP | 2009157359 A | 7/2009 |
| JP | 2011-186085 A | 9/2011 |
| JP | 2011-212550 A | 10/2011 |
| KR | 2010-071998 A | 6/2010 |
| WO | 20111125957 A1 | 10/2011 |

OTHER PUBLICATIONS

International Search Report, PCT/JP2011/058471, Jul. 5, 2011.
International Search Report dated Apr. 3, 2012 corresponding to PCT/JP2012/051973.
Office Action issued Aug. 18, 2014 in corresponding Korean Patent Application No. 10-2012-7019771.
Chinese Office Action dated Oct. 30, 2014 corresponding to Chinese Application No. 201228000603.0 of U.S. Appl. No. 13/581,913.
Korean Office Action dated Dec. 12, 2014 corresponding to Korean Application No. 20128000603.0 of U.S. Appl. No. 13/581,913.
Taiwanese Office Action dated Nov. 18, 2014 corresponding to Taiwanese Application No. 20128000603.0 of U.S. Appl. No. 13/581,913.

* cited by examiner

PRODUCTION METHOD OF LAYERED FILM, PRODUCTION METHOD OF POLARIZING LAYERED FILM AND PRODUCTION METHOD OF POLARIZING PLATE

This application is the U.S. National Phase under 35 U.S.C. §371 of International Application PCT Patent Application No. PCT/JP2011/058471, filed on Mar. 28, 2011, which claims priority to Japanese Patent Application No. 2010-081759, filed on Mar. 31, 2010; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a production method of a layered film and a production method of a polarizing plate.

BACKGROUND ART

Polarizing plates are widely used as an element for supplying polarization and an element for detecting polarization in a liquid crystal display. As such polarizing plates, those obtained by adhering a protective film composed of triacetylcellulose to a polarizing film composed of a polyvinyl alcohol resin are conventionally used, and thinning and weight reduction are recently required with development to mobile instruments such as note book type personal computers, cellular telephones and the like as liquid crystal displays, further, development to large size televisions and the like.

As a method of producing such a thin type polarizing plate, there is suggested a method in which a solution containing a polyvinyl alcohol resin is coated on the surface of a base material film to provide a resin layer, then, it is stretched and then colored to obtain a polarizing layered film having a polarizer layer, and this is utilized as it is as a polarizing plate, or a protective film is pasted on the film, then, the base material film is peeled to give a layered which is utilized as a polarizing plate (see, e.g., JP 2000-338329-A, JP 2009-93074-A, JP 2009-98653-A and JP 2003-43257-A).

In the above-described conventional method, however, a phenomenon sometimes occurs in which both ends of a base material film warp toward a resin layer side composed of a polyvinyl alcohol resin in a drying step after coating a solution containing the polyvinyl alcohol resin on the surface of the base film and the like, and if the film is allowed to flow continuously under this condition as it is, a trouble of folding the end of the film toward the inner side in a drying furnace or at an exit of a drying furnace is sometimes caused in due course.

Then, the present invention has an object of providing a method of producing a layered film or a polarizing plate with good productivity while preventing the above-described warping phenomenon.

DISCLOSURE OF THE INVENTION

[1] A method of producing a layered film, the method comprising a coating step of applying a solution containing a polyvinyl alcohol resin onto one surface of a base material film to form a resin coated layer, and a drying step of drying the resin coated layer to form a resin layer, wherein in the coating step, un-coated portions on which the above-described solution is not applied are formed in regions each being 0.5 cm or more separated inward from each of the base material film's edges opposing each other along the width direction of the base film.

[2] The method of producing a layered film according to [1], wherein the un-coated portions each extend to 20 cm or less inward from the each of the opposing edges.

[3] A method of producing a polarizing layered film, the method comprising a step of preparing a layered film produced by the production method according to [1] or [2], a removal step of removing un-coated portions from the layered film by cutting a base material film, a stretching step of uniaxially stretching the layered film from which the un-coated portions have been removed to obtain a stretched film, and a coloring step of coloring a resin layer of the stretched film with a dichroic coloring matter to form a polarizer layer, in this order.

[4] A method of producing a polarizing layered film comprising a step of preparing a layered film produced by the production method according to [1] or [2], a stretching step of uniaxially stretching the above-described layered film to obtain a stretched film, a removal step of removing the above-described un-coated portions from the above-described stretched film by cutting the above-described base material film, and a coloring step of coloring the resin layer of the layered film from which the un-coated portions have been removed with a dichroic coloring matter to form a polarizer layer, in this order.

[5] The production method of a polarizing layered film according to [3] or [4], wherein the stretching step includes uniaxial stretching of the layered film in a draw ratio of more than 5.

[6] A method of producing a polarizing plate comprising a step of preparing a polarizing layered film produced by the production method according to any one of [3] to [5], a laminating step of laminating a protective film to the polarizer layer of the polarizing laminate film on the surface opposite to the base film to obtain a multi-layer film, and a stripping step of stripping the base material film from the multi-layer film.

In a method of producing a layered film or a polarizing plate having a step of applying a resin solution onto the surface of a base material film to form a resin layer according to the production method of the present invention, generation of warping of an edge can be prevented, thereby preventing folding of the edge.

MODES FOR CARRYING OUT THE INVENTION

The present invention is a method of producing a layered film comprising a coating step of applying a solution containing a polyvinyl alcohol resin onto one surface of a base material film to form a resin coated layer, and a drying step of drying the above-described resin coated layer to form a resin layer, wherein in the above-described coating step, un-coated portions on which the above-described solution is not applied are formed in regions each being 0.5 cm or more separated inward from each of the above-described base material film's edges opposing each other along the width direction thereof. Preferably, the above-described un-coated portions each extend to 20 cm or less inward from each of the opposing edges of the above-described base material film.

Preferable embodiments of the method of producing a polarizing plate of the present invention will be illustrated in detail below with reference to drawings.

First Embodiment

Figure 1:
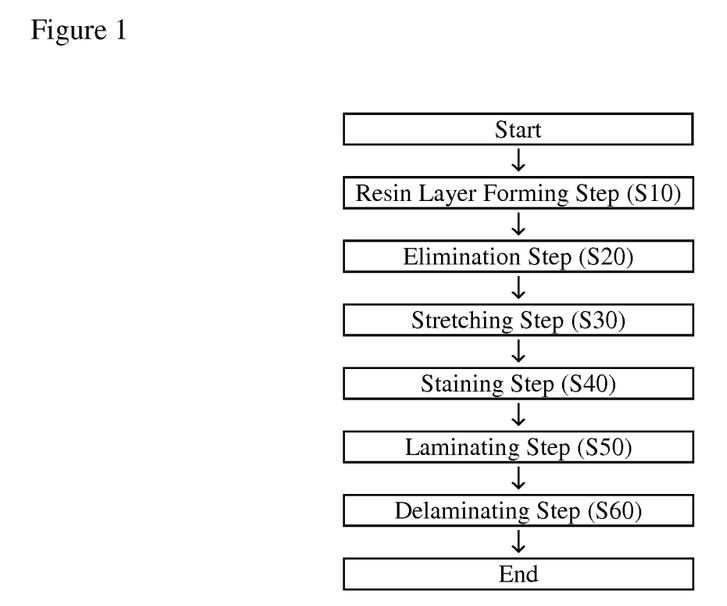
FIG. 1 is a flow chart showing the first embodiment of the method of producing a polarizing plate of the present invention.

FIG. 1 is a flow chart showing the first embodiment of the method of producing a polarizing plate of the present invention. The method of producing a polarizing plate according to the present embodiment has a resin layer formation step (S10) of forming a resin layer composed of a polyvinyl alcohol resin on one surface of a base material film to give a layered film. This step includes a coating step of applying a polyvinyl alcohol resin solution and a drying step of drying a solvent from the applied resin solution to give a layered film. In the coating step, un-coated portions on which the above-described solution is not applied are formed in regions each being 0.5 cm or more separated inward from each of the base material film's edges opposing each other along the width directionof the base film. Preferably, the un-coated portions each extend to 20 cm or less inward from each of the opposing edges of the base material film.

Thereafter, a removal step (S20) of removing the above-described un-coated portions by cutting the base material film is performed. The cutting position of the base material film is not restricted providing that all the un-coated portions are included in cut parts, and for example, cutting may be effected at the borderline between the un-coated portions and coated portions on which the resin solution is applied on the base material film, or cutting may be effected in the coated portions to remove all the un-coated portions and a part of the coated portions. Specifically, a case is provided as an example and explained in which un-coated portions on which the polyvinyl alcohol resin solution is not applied are formed in regions each being 0.5 cm separated inward from each of the base material film's edges opposing each other along the width direction of the base film, and the polyvinyl alcohol resin solution is applied on the other region. In this case, the cutting positions of the base material film are not particularly restricted providing that they are positions each being 0.5 cm or more separated inward from each of the base material film's edges opposing each other along the width direction of the base film.

Next, a stretching step (S30) of uniaxially stretching the layered film from which the un-coated portions have been removed to give a stretched film is performed. Preferably, the draw ratio in which the uniaxial stretching treatment is effected is more than 5. By using a draw ratio of more than 5, a polarizing plate having a desired polarization performance can be produced. It is because in the case of carrying out uniaxial stretching in a high draw ratio for obtaining such a polarizing plate having a high polarization performance, a problem of warping becomes remarkable, thus, the effect of the present invention capable of suppressing warping becomes remarkable. Further, uniaxial stretching is preferably free end longitudinal uniaxial stretching, which is a stretching method showing relatively low tendency of reducing thickness.

Thereafter, a coloring step (S40) of coloring a resin layer with a dichroic coloring matter to form a polarizer layer is carried out. A film having a polarizer layer after completion of this step is called a polarizing layered film. That is, the production method of obtaining a polarizing layered film by the S10 to S40 steps of the present embodiment is the method of producing a polarizing laminate film according to the present invention.

Thereafter, a laminating step (S50) of laminating a protective film to the polarizer layer of the above-described polarizing layered film on the surface opposite to the base material to obtain a multi-layer film, further a stripping step (S60) of stripping the base material film from the multi-layer film are provided. A polarizing plate is produced via these steps.

In the present embodiment, the warping phenomenon of the base material film can be prevented in the drying step of the polyvinyl alcohol resin coated layer, by provision of the un-coated portions in the coating step. A principle of such prevention of the warping phenomenon is considered below.

Figure 2:
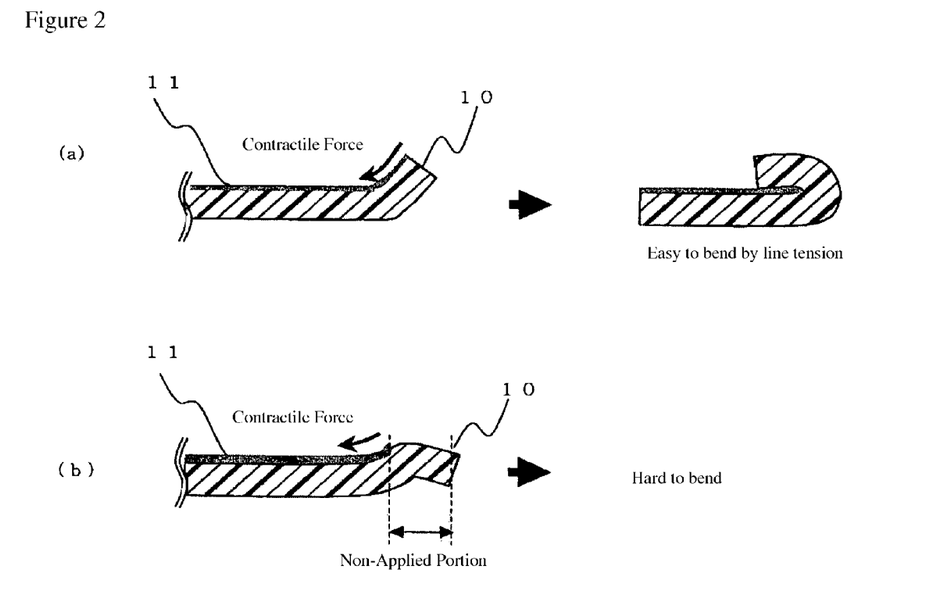
FIG. 2 is a view showing a theory of folding of a base material film due to a resin coated layer.

First, a principle of generation of warping when the resin coated layer is form on the whole surface of the base material film is estimated, and a view illustrating the estimated warping theory is shown schematically in FIG. 2(a). In contrast, a principle of suppression of warping when the resin coated layer is form with un-coated portions is estimated, and a view illustrating the estimated principle is shown schematically in FIG. 2(b). It is guessed that when a resin coated layer 11 is formed on the whole surface of a base material film 10 as shown in FIG. 2(a), large contraction force acts on the resin coated layer 11 in a drying step, and an end of the base material film 10 tends to be folded due to line tension. In contrast, it is guessed that when un-coated portions on which a resin coated layer 11 is not formed are formed on edge regions of a base material film as shown in FIG. 2(b), contraction force does not act on around an edge of the base material film 10 even in a drying step, and folding is scarcely generated. Therefore, the larger the un-coated portions, the more remarkable the effect of suppression of generation of folding. However, larger un-coated portions make the effective width narrower, leading to lowering in production efficiency, thus, the un-coated portions substantially preferably each extend to 20 cm or less, more preferably 10 cm or less inward from each of the base material film's edges.

As described above, by provision of the un-coated portions on edge regions of a base material film, folding of the base material film scarcely occurs even via a drying step, according to the present embodiment. However, the un-coated portions tend to generate waving. Waving sometimes causes breakage of a layered film, for example, in a stretching step. In the present embodiment, a removal step (S20) of removing the un-coated portions is carried out before the stretching step, thus, generation of breakage of the layered film ascribable to waving in the stretching step can be prevented. Further, a roll of good wound condition is obtained after the removal step (S20) since even if waving occurs, the waving is removed.

Second Embodiment

Figure 3:
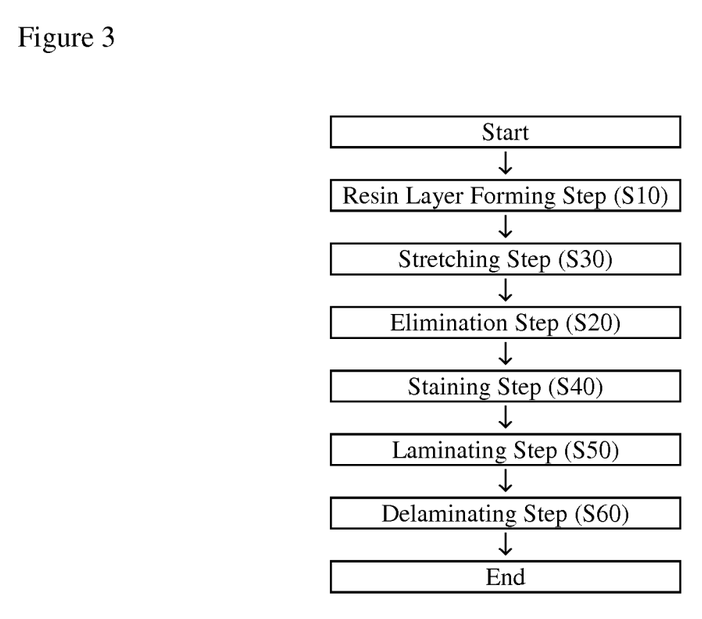
FIG. 3 is a flow charge showing the second embodiment of the method of producing a polarizing plate of the present invention.

FIG. 3 is a flow charge showing the second embodiment of the production method of a polarizing plate of the present invention. The production method of a polarizing plate of the present embodiment is different from the first embodiment only in inversion of the order of the removal step (S20) of removing un-coated portions and the stretching step (S30). In the step of the same content, the same step marks are given and repeated explanations are omitted, and detailed descriptions below are used as common explanations.

In the present embodiment, the warping phenomenon of a base material film can be prevented in a drying step of a polyvinyl alcohol resin coated layer, because un-coated portions are formed in a coating step. However, the un-coated portions tend to cause waving. When waving occurs, a trouble of incapability of well winding of a layered film on a roll tends to occurs. In the present embodiment, the removal step (S20) is provided after the stretching step (S30), and after the removal step (S20), a roll of good wound condition is obtained. Though waving sometimes causes breakage in the stretching step (S30), when a trouble of breakage is not caused in the stretching step (S30), the production method of the present embodiment is preferred.

The first and second embodiments have the removal step (S20) of removing the above-described un-coated portions by cutting a base material film before or after the stretching step (S30). In the case of the removal step before the stretching step (first embodiment), breakage can be prevented and waving of an edge can be suppressed in stretching, and well roll winding is possible. In the case of no breakage in the film stretching step, the removal step can be provided after the stretching step (second embodiment), and this case has a merit of obtaining a roll of good wound condition since the waving of an edge is removed before roll winding. In this case, the removal step (S20) is preferably provided before the step of winding a stretched film in the form of roll, and when inevitable due to instrumental restriction and the like, it is also possible that temporary provisional winding is performed once after drawing, and the roll is wound again properly while removing end regions by using a winding machine such as a rewinder and the like in a short period of time. When an edge position controller (EPC) or the like is installed before a winding part for preventing winding deviation, it is preferable to remove end regions before this for correct operation of EPC.

The S10 to S60 steps will be illustrated in detail below.

Resin Layer Formation Step (S10)

In this step, a resin layer composed of a polyvinyl alcohol resin is formed on one surface of a base material film. The thickness of the resin layer to be formed is preferably more than 3 μm and not more than 30 μm, further preferably 5 to 20 μm. When not more than 3 μm or less, the thickness becomes too small after stretching, leading to remarkable deterioration of a coloring property, and when more than 30 μm, the thickness of the finally obtainable polarizing film is over 10 μm, undesirably.

The resin layer in the present invention is preferably formed by applying a polyvinyl alcohol resin solution obtained by dissolving a powder of a polyvinyl alcohol resin in a good solvent onto one surface of a base material film and vaporizing the solvent. By thus forming the resin layer, it is possible to form the layer in a reduced thickness.

As the method of applying a polyvinyl alcohol resin solution onto a base material film, a wire bar coating method, roll coating methods such as reverse coating and gravure coating, a die coat method, a comma coat method, a lip coat method, a spin coating method, a screen coating method, a fountain coating method, a dipping method, a spray method and the like can be appropriately selected from known methods and adopted.

In the first and second embodiments, it is necessary that un-coated portions on which a polyvinyl alcohol resin solution is not applied are formed on both edge regions of a base material film, for suppressing warping of the base material film's edge regions. Particularly for suppressing folding of the edge regions due to warping, it is necessary that the un-coated portions have a width of a certain value or more. Specifically, the effect of warping suppressing is manifested, when un-coated portions on which a polyvinyl alcohol resin solution is not applied are formed in regions each being 0.5 cm or more separated inward from each of the base material film's edges opposing each other along the width direction of the base film.

Removal Step (S20)

In the first and second embodiments, as a result of provision of un-coated portions in the resin layer formation step (S10), a trouble of waving of edge regions occurs in the stretching step in the case of no additional treatment. For avoiding this waving, each embodiment has a step (S20) of removing edge regions before the stretching step (S30) (first embodiment) or after the stretching step (S30) (second embodiment). The removal step is preferably one which is capable of treating a long object continuously such as a roll. Though the method is not particularly restricted, for example, a method generally called a slitter can be suitably used. In the case of no generation of waving in un-coated portions in the stretching step, it is also possible to produce a polarizing layered film and a polarizing plate by a method including no removal step, using a layered film obtained by the inventive method described above.

Examples of the slitter include methods using a razor blade. Among analogous methods using a razor blade are midair cut of slitting in the air without particularly providing a backup guide, a groove roll method in which a blade is inserted in a grooved roll as a backup guide to stabilize meandering of a slit, and the like. Additionally, use is made of a method in which two circular blades called a shear blade are used and slitting is conducted by applying contact pressure to a lower blade by an upper blade while rotating in synchronization with conveyance of a film, a method in which a blade called a score blade is pressed to a quenching roll and the like to effect slitting, further, a method in which two shear blades are combined and used like scissors for cutting to effect slitting, and the like. Of them, "a groove roll method using a razor blade" which is a method in which the slit position of a film can be easily changed and running is stabilized easily, and other methods are suitably used.

It is efficient that this removal step (S20) is incorporated into an inline of any other step and carried out, since a not so large equipment is required. For example, in the case of incorporation into the resin layer formation step (S10), it is possible that an edge region removing apparatus such as a slitter is placed after a drying furnace or the like for removing a solvent and edge regions as un-coated portions are moved in this apparatus, then, winding in the form of roll is conducted under this condition. Likewise, the apparatus may also be placed directly before or directly after a stretching heating furnace in the stretching step, and the like. Obviously, only the slitting step may be present as another independent step. Examples of such an independent step include a step in which a slitter is installed in an apparatus called a rewinder for effecting replace winding of a roll, and the like In the case of generation of waving of edge regions of a base material film in the stretching step, a trouble of incapability of proper roll winding occurs in winding after stretching. Also in the case of feeding a stretched film as received to a coloring step without winding, troubles occur such as generation of meandering due to waving of edge regions, folding of edge regions at nip rolls or the like. Further, when waving of edge regions in the stretching step is excessively remarkable, breakage sometimes occurs during the stretching step. In such a case, it is effective to remove waving of edge regions in stretching, by removing edge regions before stretching as in the first embodiment. In the case of generation of no significant breakage in the stretching step, edge regions may be removed after the stretching step as in the second embodiment.

The cause for generation of troubles such as breakage and waving of a film from which un-coated portions are not removed includes a difference in stretching and shrinking behavior of a film in stretching between a part composed only of a base material film and a part as a layered film. A part of a base material film carrying thereon a resin layer formed shows stretching and shrinking behavior as a two-layer film, while a part of only a base material film shows behavior as a base material film single object, resulting in a difference in dimension between both the parts. Thus, in usual cases, a base material film having smaller thickness is easily affected by heat, and it tends to show more elongated condition, and waving like edge lace of a film often occurs. It is guessed that in the case of waving of a film, line tension is not applied uniformly to edge regions of a base material film, a stress concentration point is generated and breakage occurs from this part. When such a waved film is detected by an edge position controller (EPC), meandering occurs since the edge cannot be detected successfully. Further, because of protrusion from the surface of a layered film and wave and curl up and down, such parts become bulky in roll winding and proper roll winding is not obtained.

Under such a point of view, even parts around the edge of the formed resin layer show a difference in stretchability and thus the same trouble possibly occurs, when the resin layer is extremely thick or extremely thin. Therefore, in edge region removal, it is of course preferable to remove un-coated portions only composed of a base material film, and it is also possible to remove parts of extremely different thickness by removal at somewhat inner side than the un-coated portions. Obviously, it may be permissible to effect removal so that the removed parts correspond to the un-coated portions, when the thickness of the resin layer is relatively constant up to the edge and there is no need to remove the resin layer.

The drying temperature is for example 50 to 200° C., preferably 60 to 150° C. The drying time is for example 2 to 20 minutes. As the resin layer of a polyvinyl alcohol resin increases, the drying temperature and the drying time needed in the drying step becomes higher and longer, respectively. As a result, a larger quantity of heat is needed for a base material film, the toughness of the film lowers, and folding of edge regions of the film tends to occurs. Also under such a point of view, folding of the film tends to occur when a polyvinyl alcohol resin is coated more thickly. Therefore, the effect of preventing folding by the production method of the present embodiment is more remarkable when the resin layer is thicker.

For improving adherence between a base material film and a polyvinyl alcohol resin layer, a primer layer may be disposed between the base material film and the resin layer. It is preferable for the primer layer to be formed of a composition containing a cross-linking agent and the like in a polyvinyl alcohol resin from the standpoint of adherence.

In this case, the primer layer may be produced with un-coated portions in both edge regions of a base material film for the same reason as described above, however, in usual cases, the primer layer is considerably thinner as compared with the resin layer and thus has weaker contraction force and therefore the primer layer is less likely to cause the problem as described above. Therefore, the un-coated portions in the present invention denote portions which have no resin layer, and whether a portion is an un-coated portion or not is irrelevant to whether a primer layer has been applied there or not and is determined by whether the resin layer has been applied there or not.

Base Material Film

As the material of the base material film used in the present embodiment, for example, thermoplastic resins excellent in transparency, mechanical strength, thermal stability, stretchability and the like are used. Specific examples of such thermoplastic resins include cellulose ester resins such as cellulose triacetate, polyester resins, polyether sulfone resins, polysulfone resins, polycarbonate resins, polyamide resins, polyimide resins, polyolefin resins, (meth)acrylic resins, cyclic polyolefin resins (norbornene resins), polyallylate resins, polystyrene resins, polyvinyl alcohol resins and mixtures thereof.

As the material of the base material film, at least any one material selected from the group consisting of cellulose ester resins, polyolefin resins, cyclic polyolefin resins and (meth)acrylic resins is preferably contained.

The cellulose ester resin is an ester of cellulose and a fatty acid. Specific examples of such a cellulose ester resin include cellulose triacetate, cellulose diacetate, cellulose tripropionate, and cellulose dipropionate.

Of them, cellulose triacetate is particularly preferable. Cellulose triacetate is advantageous from the standpoint of easy availability and cost because many products thereof are commercially marketed. Examples of commercially marketed products of cellulose triacetate include FUJITAC (registered trademark) TD80 (manufactured by FUJIFILM Corporation), FUJITAC (registered trademark) TD80UF (manufactured by FUJIFILM Corporation), FUJITAC (registered trademark) TD80UZ (manufactured by FUJIFILM Corporation), FUJITAC (registered trademark) TD40UZ (manufactured by FUJIFILM Corporation), KC8UX2M (manufactured by KONICA MINOLTA OPTO, INC.), and KC4UY (manufactured by KONICA MINOLTA OPTO, INC.).

Examples of the polyolefin resin include polyethylene and polypropylene. A base material film made of polypropylene is preferably usedbecause it is easily stretched stably in a high draw ratio. As the cyclic polyolefin resin, norbornene resins are preferably used.

The cyclic polyolefin resin is a generic name for resins obtained by polymerization using a cyclic olefin as a polymerization unit, and includes resins described in, for example, JPH01-240517-A, JPH03-14882-A, and JPH03-122137-A. Specific examples thereof include ring-opened (co)polymers of cyclic olefins, addition polymers of cyclic olefins, copolymers of a cyclic olefin with an α-olefin such as ethylene and propylene (typically, random copolymers), graft polymers obtained by modifying these compounds with an unsaturated carboxylic acid or its derivative, and hydrides thereof. Specific examples of the cyclic olefin includes norbornene monomers.

As the cyclic polyolefin resin, various products are commercially marketed. Specific examples thereof include Topas (registered trademark) (manufactured by Ticona), ARTON (registered trademark) (manufactured by JSR), ZEONOR (registered trademark) (manufactured by Zeon Corporation), ZEONEX (registered trademark) (manufactured by Zeon Corporation), and APEL (registered trademark) (manufactured by Mitsui Chemicals, Inc.).

As the (meth)acrylic resin, any suitable (meth)acrylic resins can be adopted. Examples thereof include poly(meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (for example, MS resin), polymers having an alicyclic hydrocarbon group (for example, methyl methacrylate-cyclohexyl methacrylate copolymer and methyl methacrylate-norbornyl(meth)acrylate copolymer).

Preferably, polyC$_{1-6}$alkyl(meth)acrylates such as polymethyl(meth)acrylate are mentioned. As the (meth)acrylic resin, methyl methacrylate resins containing methyl methacrylate as the main component (50 to 100 wt %, preferably 70 to 100 wt %) are more preferably used.

To the base material film, any suitable additives may be added, in addition to the above-described thermoplastic resins. Examples of such additives include ultraviolet absorbers, antioxidants, lubricants, plasticizers, releasing agents, coloration inhibitors, flame retardants, nucleating agents, antistatic agents, pigments, and coloring agents. The content of the thermoplastic resin exemplified above in the base material film is preferably 50 to 100 wt %, more preferably 50 to 99 wt %, further preferably 60 to 98 wt %, particularly preferably 70 to 97 wt %. When the content of the thermoplastic resin in the base material film is less than 50 wt %, high transparency and the like originally owned by the thermoplastic resin are possibly not manifested sufficiently.

As the base material film, those having a melting point of 110° C. or higher are preferably used so that stretching thereof can be conducted in a temperature range suitable for stretching of a polyvinyl alcohol resin. Those having a melting point of 130° C. or higher are preferably used. It is because when the melting point of the base material film is lower than 110° C., the base material film tends to be melted and the stretching temperature cannot be raised sufficiently, and stretching to more than 5 times becomes difficult in the stretching step (S30) described later. The melting point of the base material film is a value measured at a temperature rising rate of 10° C./min according to ISO3146.

The thickness of the base material film can be appropriately determined, and in general, it is preferably 1 to 500 µm, more preferably 1 to 300 µm, further preferably 5 to 200 µm from the standpoint of strength and workabilities such as a handling property. The thickness of the base material film is most preferably 5 to 150 µm.

To the base material film, a corona treatment, a plasma treatment, a flame treatment and the like may be applied on at least the surface on which a resin layer is to be formed, for improving adherence to the resin layer. For improvement in adherence, a thin layer such as a primer layer may be formed on the base material on the surface thereof on which a resin layer is to be formed.

Resin Layer

In the resin layer of the present embodiment, a polyvinyl alcohol resin is used. As the polyvinyl alcohol resin to be used in the present invention, those having a degree of saponification of 90 mol % to 100 mol % are suitably used, and partially modified polyvinyl alcohol resins may also be used. Examples thereof include those obtained by modifying the polyvinyl alcohol resin with an olefin such as ethylene and propylene, an unsaturated carboxylic acid such as acrylic acid, methacrylic acid, and crotonic acid, an alkyl ester of an unsaturated carboxylic acid, an acrylamide and the like, in a proportion of several %. The average degree of polymerization of the polyvinyl alcohol resin is not particularly restricted, and is preferably 100 to 10000, more preferably 1500 to 10000.

The polyvinyl alcohol resin giving such properties includes, for example, PVA124 (degree of saponification: 98.0 to 99.0 mol %), PVA117 (degree of saponification: 98.0 to 99.0 mol %), PVA624 (degree of saponification: 95.0 to 96.0 mol %), PVA617 (degree of saponification: 94.5 to 95.5 mol %) and the like manufactured by Kuraray Co., Ltd.; for example, AH-26 (degree of saponification: 97.0 to 98.8 mol %), AH-22 (degree of saponification: 97.5 to 98.5 mol %), NH-18 (degree of saponification: 98.0 to 99.0 mol %), N-300 (degree of saponification: 98.0 to 99.0 mol %) and the like manufactured by The Nippon Synthetic Chemical Industry Co., Ltd.; for example, JF-17 (degree of saponification: 98.0 to 99.0 mol %), JF-17L (degree of saponification: 98.0 to 99.0 mol %), and JF-20 (degree of saponification: 98.0 to 99.0 mol %) manufactured by Japan Vam & Poval Co., Ltd., and these can be suitably used.

Stretching Step (S30)

Here, it is preferable that a layered film composed of a base material film and a resin layer is uniaxially stretched in a draw ratio of more than 5 with respect to the original length of the layered film. Preferably, uniaxial stretching is conducted in a draw ratio of more than 5 and not more than 17. Further preferably, uniaxial stretching is conducted in a draw ratio of more than 5 and not more than 8. If the draw ratio is 5 or less, a resin layer composed of a polyvinyl alcohol resin is not sufficiently oriented, resulting in insufficient increase in the degree of polarization of a polarizing film. In contrast, if the draw ratio is more than 17, breakage of the layered film in stretching tends to occur and simultaneously, the thickness of the layered film becomes smaller more than required, and processability and a handling property thereof possibly lower in the subsequent step. The uniaxial stretching treatment in the stretching step (S30) is not restricted to one stage stretching, and multi-stage stretching can also be carried out. In the case of multi-stage stretching, it is preferable to carry out the stretching treatment so that all stages of the stretching treatment manifest a draw ratio of more than 5 in total.

In the stretching step (S30) in the first and second embodiments, a longitudinal stretching treatment carried out along the longitudinal direction of the layered film is preferable. As the longitudinal stretching mode, for example, an inter-roll stretching method, a compression stretching method, and a stretching method using a tenter are mentioned. The stretching treatment is not limited to a longitudinal stretching treatment, and an inclined stretching treatment and the like may also be used.

As the stretching treatment, any of a wet stretching method and a dry stretching method can be adopted, and use of a dry stretching method is preferable since the temperature in stretching a layered film can be selected from a wider range.

In the first and second embodiments, a stretching treatment is carried out in a range of from a temperature 30° C. lower than the melting point of a base material film to a temperature 5° C. higher than the melting point thereof. Further preferably, a stretching treatment is carried out in a range of from a temperature 25° C. lower than the melting point of a base material film to the melting point thereof. When the stretching temperature is lower than a temperature 30° C. lower than the melting point of a base material film, stretching in a high draw ratio of more than 5 is difficult. When the stretching temperature is over a temperature 5° C. higher than the melting point of a base material film, stretching becomes difficult undesirably due to melting of a base material film. The stretching temperature is within the above-described range and further preferably 120° C. or higher. It is because when the stretching temperature is 120° C. or higher, the stretching treatment is not accompanied by difficulty even if a high draw ratio of more than 5 is used. Control of the temperature of the stretching treatment is usually carried out by control of the temperature of a heating furnace.

Coloring Step (S40)

Here, the resin layer of the layered film is colored with a dichroic substance. Examples of the dichroic substance include iodine and organic dyes. As the organic dye, for example, Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black can be used. These dichroic substances may be used singly or in combination.

The coloring step is carried out, for example, by dipping the whole body of a layered film composed of a base material film and a resin layer into a solution containing the above-described dichroic substance (coloring solution). As the coloring solution, a solution prepared by dissolving the above-described dichroic substance in a solvent can be used. As the solvent of the coloring solution, water is used in general, and an organic solvent compatible with water may be further added. The concentration of the dichroic substance is preferably 0.01 to 10 wt %, more preferably 0.02 to 7 wt %, particularly preferably 0.025 to 5 wt %.

In the case of use of iodine as the dichroic substance, it is preferable to further add an iodide since the coloring efficiency can be further improved. Examples of the iodide include potassium iodide, lithium iodide, sodium iodide, zinc iodide, aluminum iodide, lead iodide, copper iodide, barium iodide, calcium iodide, tin iodide, and titanium iodide. The addition proportion of these iodides is preferably 0.01 to 10 wt % in the coloring solution. Among the iodides, potassium iodide is preferably added. In the case of addition of potassium iodide, the ratio by weight of iodine to potassium iodide is preferably in the range of 1:5 to 1:100, more preferably in the range of 1:6 to 1:80, particularly preferably in the range of 1:7 to 1:70.

The dipping time of a layered film into the coloring solution is not particularly restricted, and usually, it is preferably in the range of 15 seconds to 15 minutes, more preferably 1 minute to 3 minutes. The temperature of the coloring solution is preferably in the range of 10 to 60° C., more preferably in the range of 20 to 40° C.

In the coloring step, a cross-linking treatment can be carried out following coloring. The cross-linking treatment can be conducted, for example, by dipping a layered film into a solution containing a cross-linking agent (cross-linking solution). As the cross-linking agent, conventionally known substances can be used. Examples thereof include boron compounds such as boric acid and borax, glyoxal, and glutaraldehyde. These substances may be used singly or in combination.

As the cross-linking solution, a solution prepared by dissolving a cross-linking agent in a solvent can be used. As the solvent, for example, water can be used, and further, an organic solvent compatible with water may be contained. The concentration of the cross-linking agent in the cross-linking solution is, but not limited to, a value in the range of 1 to 10 wt %, more preferably 2 to 6 wt %.

In the cross-linking solution, an iodide may be added. By addition of an iodide, a polarization property in a plane of a resin layer can be more uniformalized. Examples of the iodide include potassium iodide, lithium iodide, sodium iodide, zinc iodide, aluminum iodide, lead iodide, copper iodide, barium iodide, calcium iodide, tin iodide and titanium iodide. The content of the iodide is 0.05 to 15 wt %, more preferably 0.5 to 8 wt %.

Usually, the dipping time of a layered film into the cross-linking solution is preferably 15 seconds to 20 minutes, more preferably 30 seconds to 15 minutes. The temperature of the cross-linking solution is preferably in the range of 10 to 80° C.

Thereafter, a washing step and a drying step are preferably carried out. As the washing step, a water-washing treatment can be performed. The water-washing treatment can be carried out usually by dipping a layered film into pure water such as ion exchange water and distilled water. The water-washing temperature is usually in the range of 3 to 50° C., preferably 4° C. to 20° C. The dipping time is usually 2 to 300 seconds, preferably 3 seconds to 240 seconds.

In the washing step, a washing treatment with an iodide solution and a water-washing treatment may be combined, and a solution prepared by appropriately compounding a liquid alcohol such as methanol, ethanol, isopropyl alcohol, butanol, and propanol can also be used.

It is preferable to perform a drying step after the washing step. As the drying step, any suitable methods (for example, natural drying, blast drying, and heat drying) can be adopted. For example, in the case of heat drying, the drying temperature is usually 20 to 95° C. and the drying time is usually about 1 to 15 minutes. By the above-described coloring step (S40), a resin layer is provided with a function as a polarizing film. In the present specification, a resin layer after the coloring step (S40) is called a polarizer layer, and a layered film having a polarizer layer is called a polarizing layered film.

Laminating Step (S50)

Here, a protective film is laminated to a polarizer layer of a polarizing layered film on the surface opposite to a base material. The method of laminating a protective film includes a method of laminating a polarizer layer and a protective film with a pressure sensitive adhesive and a method of laminating a polarizer layer and a protective film with an adhesive.

Protective Film

The protective film used in the present embodiment may be a simple protective film having no optical function, or a protective film having an optical function together such as a phase retardation film and a brightness enhancement film. The material of the protective film is not particularly restricted, and examples thereof include films conventionally widely used in the art such as cyclic polyolefin resin films, cellulose acetate resin films made of a resin such as triacetylcellulose and diacetylcellulose, polyester resin films made of a resin such as polyethylene terephthalate, polyethylene naphthalate and polybutylene terephthalate, polycarbonate resin films, acrylic resin films, and polypropylene resin films.

As the cyclic polyolefin resin, suitable commercially marketed products, for example, Topas (registered trademark) (manufactured by Ticona), ARTON (registered trademark) (manufactured by JSR), ZEONOR (registered trademark) (manufactured by Zeon Corporation), ZEONEX (registered trademark) (manufactured by Zeon Corporation) and APEL (registered trademark) (manufactured by Mitsui Chemicals, Inc.) can be preferably used. When such a cyclic polyolefin resin is formed into a film, known methods such as a solvent cast method and a melt extrusion method are appropriately used. Further, commercially marketed products of previously formed cyclic polyolefin resin films such as Escena (registered trademark) (manufactured by Sekisui Chemical Co., Ltd.), SCA40 (manufactured by Sekisui Chemical Co., Ltd.), and ZEONOR (registered trademark) film (manufactured by Optes, Inc.) may be used.

As the cyclic polyolefin resin film, those uniaxially stretched or biaxially stretched may be used. By stretching, the cyclic polyolefin resin film can be endowed with any phase retardation value. Stretching is usually conducted continuously while unwinding a film roll, and stretching is performed toward the movement direction of a roll, toward a direction vertical to the movement direction, or toward both the directions, in a heating furnace. The temperature of the heating furnace is usually in the range from a temperature around the glass transition temperature of the cyclic polyolefin resin up to a temperature higher by 100° C. than the glass transition temperature thereof. The draw ratio is usually 1.1 to 6, preferably 1.1 to 3.5 for one direction.

Since the cyclic polyolefin resin film is in general poor in surface activity, it is preferable to conduct surface treatments such as a plasma treatment, a corona treatment, an ultraviolet irradiation treatment, a flame treatment, and a saponification treatment on the surface to be adhered to a polarizer layer. Of them, a plasma treatment and a corona treatment, which can be carried out relatively easily, are suitable.

As the cellulose acetate resin film, suitable commercially marketed products, for example, FUJITAC (registered trademark) TD80 (manufactured by FUJIFILM Corporation), FUJITAC (registered trademark) TD80UF (manufactured by FUJIFILM Corporation), FUJITAC (registered trademark) TD80UZ (manufactured by FUJIFILM Corporation), FUJITAC (registered trademark) TD40UZ (manufactured by FUJIFILM Corporation), KC8UX2M (manufactured by KONICA MINOLTA OPTO, INC.) and KC4UY (manufactured by KONICA MINOLTA OPTO, INC.) can be preferably used.

On the surface of the cellulose acetate resin film, a liquid crystal layer and the like may be formed for improving a view angle property. Further, the cellulose acetate resin film may be stretched for giving a phase retardation. On the cellulose acetate resin film, a saponification treatment is usually performed for enhancing adhesiveness to a polarizing film. As the saponification treatment, methods of dipping into an aqueous solution of an alkali such as sodium hydroxide and potassium hydroxide can be adopted.

On the surface of the protective film as described above, optical layers such as a hard coat layer, an anti-glare layer, an anti-reflection layer and the like can also be formed. The method for forming these optical layers on the surface of the protective film is not particularly restricted, and known methods can be used.

It is preferable that the thickness of the protective film is small owing to a requirement for thinning, and the thickness is preferably 88 μm or less, more preferably 48 μm or less. Since when the thickness is too small, strength lowers, leading to poor processability, thus, it is preferably 5 μm or more.

Pressure Sensitive Adhesive

The pressure sensitive adhesive to be used for laminating of a protective film and a polarizer layer is usually composed of a composition obtained by adding a cross-linking agent such as an isocyanate compound, an epoxy compound, and an aziridine compound to a base polymer such as an acrylic resin, a styrene resin, and a silicone resin. Further, a pressure sensitive adhesive layer showing a light scattering property can also be prepared by inclusion of fine particles.

The thickness of the pressure sensitive adhesive layer is preferably 1 to 40 μm, and it is preferable to apply the layer as thinly as possible unless properties such as processability and durability are impaired, and the thickness of the layer is more preferably 3 to 25 μm. A thickness of 3 to 25 μm is suitable for obtaining good processability and for suppressing dimension change of a polarizing film. When the thickness of the pressure sensitive adhesive layer is less than 1 μm, pressure sensitive adhesiveness lowers and when over 40 μm, troubles such as protrusion of the pressure sensitive adhesive, and the like, tend to occur.

In a method of laminating a protective film to a polarizer layer with a pressure sensitive adhesive, the protective layer may be laminated to the polarizer layer after forming a pressure sensitive adhesive layer on a surface of the protective film, or a pressure sensitive adhesive layer may be provided on a surface of a polarizer layer followed by laminating of a protective film thereto.

The method for forming a pressure sensitive adhesive layer is not particularly restricted, and it may be permissible that a solution containing components typically including the base polymer as described above is applied to the surface of a protective film or to the surface of a polarizer layer, and dried to form a pressure sensitive adhesive layer, then, the protective film and the polarizer layer are laminated, or it may be permissible that a pressure sensitive adhesive layer is formed on a separator, then, transferred to the surface of a protective film or the surface of a polarizer layer and laminated. In forming a layere of a pressure sensitive adhesive on the surface of a protective film or a polarizer layer, a adhering treatment, for example, a corona treatment may be applied to one of or both of the surface of the protective film or the polarizer layer, and the pressure sensitive adhesive, if necessary.

Adhesive

The adhesive used for laminating of a protective film and a polarizer layer includes, for example, aqueous adhesives using a polyvinyl alcohol resin aqueous solution, an aqueous two-component urethane emulsion adhesive and the like. In the case of use of a cellulose acetate film hydrophilized by a saponification treatment and the like as a protective film, a polyvinyl alcohol resin aqueous solution is suitably used as the aqueous adhesive for laminating to a polarizer layer. The polyvinyl alcohol resin used as the adhesive includes vinyl alcohol homopolymers obtained by saponification of polyvinyl acetate, which is a homopolymer of vinyl acetate, and additionally, vinyl alcohol copolymers obtained by saponification of a copolymer of vinyl acetate and other monomer copolymerizable therewith, and further, modified polyvinyl alcohol polymers obtained by partial modification of hydroxyl groups of them. To the aqueous adhesive, polyfunctional aldehydes, water-soluble epoxy compounds, melamine compounds, zirconia compounds, zinc compounds and the like may be added as an additive. In the case of use of such an aqueous adhesive, the adhesive layer obtained therefrom usually has a thickness of 1 μm or less, and the adhesive layer is not virtually observed even if its cross-section is observed by an ordinary optical microscope.

The method of laminating a polarizer layer and a protective film using an aqueous adhesive is not particularly restricted and includes, for example, a method in which an adhesive is uniformly applied to the surface of the polarizer layer and/or the protective film, another film is overlapped on the applied surface and laminated with the aid of a roll or the like and dried. Usually, the adhesive is applied at a temperature of 15 to 40° C. after the preparation thereof, and the laminating temperature is usually within the range of 15 to 30° C.

In the case of use of an aqueous adhesive, after the lamination of a polarizer layer and a protective film, the resulting layered film is dried in order to remove water contained in the aqueous adhesive. The temperature of a drying furnace is preferably 30° C. to 90° C. When lower than 30° C., there is a tendency that the surface of a polarizer layer and the surface of a protective film are easily peeled from each other. When 90° C. or more, there is a possibility of deterioration of an optical performance due to heat. The drying time may be 10 to 1000 seconds, and particularly from the standpoint of productivity, is preferably 60 to 750 seconds, further preferably 150 to 600 seconds.

After drying, the layered film may be aged at room temperature or a somewhat higher temperature than this, for example, a temperature of about 20 to 45° C. for 12 to 600 hours. It is general that the temperature in the aging is set lower than the temperature adopted in drying.

A photo-curable adhesive can also be used as the adhesive in laminating a polarizer layer and a protective film. The photo-curable adhesive includes, for example, a mixture of a photo-curable epoxy resin and a photocation polymerization initiator.

As the method of laminating a polarizer layer and a protective film with a photo-curable adhesive, conventionally known methods can be used, and there are mentioned, for example, methods in which an adhesive is applied to the adhesion surface of a polarizer layer and/or a protective film by a casting method, a Mayer bar coat method, a glavure coat method, a comma coater method, a doctor plate method, a die coat method, and a dip coat method, a spraying method, and then the polarizer layer and the protective film are overlapped. The casting method is a method in which a polarizing film or a protective film to be coated is moved toward approximately the vertical direction, approximately the horizontal direction or an inclined direction between them and an adhesive is allowed to fall and spread on its surface.

After applying an adhesive to the surface of a polarizer layer or a protective film, the polarizing film and the protective film are adhered by being sandwiched and laminated via the adhesive coated surface by nip rolls or the like. Further, a method can also be suitably used in which a polarizer layer and a protective film are overlapped and an adhesive is dropped to therebetween with the polarizer layer and the protective film overlapped, then, and the resulting laminate is pressured by a roll or the like to spread the adhesive uniformly. In this case, metal, rubber and the like can be used as the material of the roll. Further, a method is also preferably adopted in which an adhesive is dropped to between a polarizer layer and a protective film, then, the resulting laminate film is passed through between a roll and another roll, and thereby pressed to spread the adhesive. In this case, these rolls may be made of the same material or different materials. The thickness before drying or curing of the adhesive layer after lamination using the above-described nip rolls or the like is preferably not more than 5 μm and not less than 0.01 μm.

To the adhesion surface of a polarizer layer and/or a protective film, surface treatments such as a plasma treatment, a corona treatment, an ultraviolet irradiation treatment, a flame treatment, and a saponification treatment may be appropriately applied for improving adhesiveness. The saponification treatment includes a method of dipping into an aqueous solution of an alkali such as sodium hydroxide and potassium hydroxide.

In the case of use of a photo-curable resin as the adhesive, after joining a polarizing film and a protective film, the photo-curable adhesive is cured by irradiation with an active energy ray. The light source of the active energy ray is not particularly restricted, and active energy rays showing emission distribution at a wavelength of 400 nm or less are preferable, and specifically, a low pressure mercury lamp, a medium pressure mercury lamp, a high pressure mercury lamp, an ultrahigh pressure mercury lamp, a chemical lamp, a black light lamp, a microwave excited mercury lamp, a metal halide lamp and the like are preferably used.

The intensity of the irradiation to the photo-curable adhesive is appropriately determined by the composition of the photo-curable adhesive and is not particularly restricted, and preferably, the irradiation intensity in a wavelength region effective for activation of a polymerization initiator is 0.1 to 6000 mW/cm$^2$. When the irradiation intensity is 0.1 mW/cm$^2$ or more, the reaction time is not too long, and when 6000 mW/cm$^2$ or less, there is little possibility of occurrence of yellowing of an epoxy resin and deterioration of a polarizing film due to heat radiated from the light source and due to heat generation in hardening of the photo-curable adhesive. The time of the irradiation to the photo-curable adhesive is applied depending on the photo-curable adhesive to be cured and is not particularly restricted, and the accumulated light quantity represented as the product of the above-described irradiation intensity and the irradiation time is preferably set to 10 to 10000 mJ/cm$^2$. When the accumulated quantity of the light applied to the photo-curable adhesive is 10 mJ/cm$^2$ or more, an active species derived from a polymerization initiator can be generated in sufficient amount and the curing reaction can be surely progressed, and when 10000 mJ/cm$^2$ or less, the irradiation time is not too long and good productivity can be maintained. The thickness of the adhesive layer after irradiation with an active energy ray is usually about 0.001 to 5 μm, preferably 0.01 μm or more and 2 μm or less, further preferably 0.01 μm or more and 1 μm or less.

In the case of curing the photo-curable adhesive by irradiation with an active energy ray, it is preferable to conduct curing under conditions under which functions of a polarizing plate such as the degree of polarization, transmittance, and hue of a polarizing film, and the transparency of a protective film do not deteriorate.

Stripping Step (S60)

In the production method of a polarizing plate of the present embodiment, a stripping step (S60) of stripping a base material film is carried out after a protective film laminating step (S50) of laminating a protective film onto a polarizing film, as shown in FIG. 1 or FIG. 3. In the stripping step (S60) of stripping a base material film, the base material film is stripped from a layered film. The method of stripping a base material film is not particularly restricted, and the base material film can be stripped by the same manner as in the stripping step of a release film carried out for a usual polarizing plate equipped with a pressure sensitive adhesive. After the protective film laminating step (S50), a base material film may be stripped immediately, or it may be stripped after once being wound in the form of roll, in a stripping step provided separately.

Other Optical Layer

The polarizing plate of the first and second embodiments produced as described above can be used practically as an optical film on which other optical layers have been laminated. The above-described protective film may have functions of these optical layers. Examples of the other optical layers include a reflective polarizing film which permits transmission of a certain kind of polarization light and reflects a polarization light showing the opposite nature to this, a film with an antiglare function having irregularity on its surface, a film with a surface antireflection function, a reflection film having a reflection function on its surface, a semi-transmission reflection film having a reflection function and a transmission function together and a view angle compensation film.

Commercially marketed products corresponding to the reflective polarizing film which permits transmission of a certain kind of polarization light and reflects a polarization light showing the opposite nature to this include, for example, DBEF (manufactured by 3M, available from Sumitomo 3M Limited) and APF (manufactured by 3M, available from Sumitomo 3M Limited). The view angle compensation film includes an optical compensation film in which a liquid crystalline compound is applied on the surface of a base material and oriented, a phase retardation film made of a polycarbonate resin, and a phase retardation film made of a cyclic polyolefin resin. Commercially marketed products corresponding to the optical compensation film in which a liquid crystalline compound is applied on the surface of a base material and oriented include WV film (manufactured by FUJIFILM Corporation), NH film (manufactured by Nippon Oil Corporation), NR film (manufactured by Nippon Oil Corporation) and the like. Commercially marketed products corresponding to the phase difference film made of a cyclic polyolefin resin include ARTON (registered trademark) film (manufactured by JSR), Escena (registered trademark) (manufactured by Sekisui Chemical Co., Ltd.), and ZEONORA (registered trademark) film (manufactured by Optes, Inc.).

EXAMPLES

The present invention will be illustrated further specifically by examples described below, but the present invention is not limited to these example.

Example 1

Base Material Film

As the base material film, an un-stretched polypropylene (PP) film (melting point: 163° C.) having a thickness of 110 µm was used.

Formation of Primer Layer

A polyvinyl alcohol powder (manufactured by The Nippon Synthetic Chemical Industry Co., Ltd., average degree of polymerization: 1100, degree of saponification: 99.5 mol %, trade name: Z-200) was dissolved in hot water of 95° C. to prepare an aqueous solution having a concentration of 3 wt %. A cross-linking agent (manufactured by Sumitomo Chemical Co., Ltd., trade name: Sumilese (registered trademark) resin 650) was mixed with the resultant aqueous solution, in an amount of 5 parts by weight of the agent with respect to 6 parts by weight of the polyvinyl alcohol powder.

The resultant mixed aqueous solution was applied to a corona treated base material film using a micro gravure coater, and dried at 80° C. for 10 minutes to form a primer layer having a thickness of 0.2 µm.

Formation of Resin Layer

PVA124 (manufactured by Kuraray Co., Ltd., average degree of polymerization: 2400, degree of saponification: 98.0 to 99.0 mol %) was used as a polyvinyl alcohol powder, and this was dissolved in hot water of 95° C. to prepare a polyvinyl alcohol aqueous solution having a concentration of 8 wt %. The resultant aqueous solution was applied to the above-described primer layer using a lip coater, and dried at 80° C. for 2 minutes, at 70° C. for 2 minutes and at 60° C. for 4 minutes continuously to produce a layered film having three layers composed of the base material film, the primer layer and the resin layer. In the resin layer coating step, the coating width by the lip was set at the inner side than the width of the base material film to provide un-coated portions of about 0.7 cm in both end regions. The condition of the film was checked in the drying furnace and at the exit of the drying furnace to find that folding did not occur though some warping of the edge was observed, and the film was able to be wound in the form of roll without problems. The completed film had film tabs (un-coated portions) of about 0.7 cm in width in both edge regions, and the thickness of the polyvinyl alcohol resin layer was then 8.1 µm.

Example 2

A layered film was produced in the same manner as in Example 1 excepting that un-coated portions of about 1.0 cm in width were formed in both edge regions of the base material film in the coating step. The condition of the film was checked in the drying furnace and at the exit of the drying furnace to find that folding did not occur though some warping of the edge was observed, and the film was able to be wound in the form of roll without problems. The thickness of the polyvinyl alcohol resin layer after drying was 14.5 µm.

Example 3

Stretching Step, Removal Step

The layered film obtained in Example 2 was subjected to free end uniaxial stretching of 5.8 times at 160° C. using a longitudinal stretching machine. The resultant stretched film was wound in the form of roll while removing edge parts in air using a slitter of a razor blade continuously. In this procedure, the position of the slit was distant by about 1.5 cm from the edges. The resultant film had scarce waving at the edges, and a roll of good wound condition was obtained.

Example 4

Removal Step, Stretching Step

The layered film obtained in Example 2 was re-wound while removing edge parts in air using a slitter of a razor blade continuously, to obtain a slit layered film. In this procedure, the position of the slit was distant by about 1.5 cm from the edge. The resultant slit layered film was subjected to free end uniaxial stretching of 5.8 times at 160° C. using a longitudinal stretching machine and wound in the form of roll. A long wound roll of 500 m or more was stretched continuously to find that the film was not broken and stretchability thereof was good. A roll of good wound condition with scarce waving at the edges was obtained.

Example 5

Coloring Step

Further, the stretched film obtained in Example 4 was immersed in a hot bath of 60° C. for 60 seconds, and immersed for about 150 seconds in a dying solution of 30° C. as a mixed aqueous solution of iodine and potassium iodide to effect coloring, then, excess iodine liquid was washed off by pure water of 10° C. Next, the film was immersed for 600 seconds in a 76° C. mixed aqueous solution of boric acid and potassium iodide. Thereafter, the film was washed with pure water of 10° C. for 4 seconds, and finally, dried at 50° C. for 300 seconds, to obtain a polarizing laminate film having three layers composed of the polarizer layer, the primer layer and the base material film.

Pasting of Protective Film

A polyvinyl alcohol powder (manufactured by Kuraray Co., Ltd., average degree of polymerization: 1800, trade name: KL-318) was dissolved in hot water of 95° C. to prepare an aqueous solution having a concentration of 3 wt %. A cross-linking agent (manufactured by Sumitomo Chemical Co., Ltd., trade name: Sumilese (registered trademark) resin 650) was mixed with the resultant aqueous solution, in an amount of the agent of 1 part by weight with respect to 2 parts by weight of the polyvinyl alcohol powder, to obtain an adhesive solution. The above-described polyvinyl alcohol adhesive was applied to the polarizer layer of the above-described polarizing laminate film on the surface opposite to the base material film, then, a protective film (TAC manufactured by KONICA MINOLTA OPTO, INC.: KC4UY) was laminated to obtain a five-layer polarizing plate composed of the protective film, the adhesive layer, the polarizer layer, the primer layer and the base material film. The base material film was stripped from the resultant polarizing plate. The base material film was stripped easily, to obtain a four-layer polarizing plate composed of the protective film, the adhesive layer, the polarizer layer and the primer layer. Thus obtained polarizing plate was uniform and very good in optical properties.

Comparative Example 1

A layered film was produced in the same manner as in Example 1, excepting that the polyvinyl alcohol resin was applied up to the edges of the base material film, namely, on the whole surface of the base material film in the coating step.

The condition of the film was checked in the drying furnace and at the exit of the drying furnace to find that warping at the edges was significant, and folding of the edges occurred during continuous feeding and stable continuous production was impossible. The thickness of the polyvinyl alcohol resin layer after drying was 11.5 μm.

Comparative Example 2

A layered film was produced in the same manner as in Example 1, excepting that un-coated portions of about 0.2 cm in width were formed in both edge regions of the base material film. The condition of the film was checked in the drying furnace and at the exit of the drying furnace to find that warping at the edges was significant, and folding of the edges occurred during continuous feeding and stable continuous production was impossible. The thickness of the polyvinyl alcohol resin layer after drying was 14.5 μm.

Example 6

(Stretching Step)

The layered film obtained in Example 2 was subjected directly to free end uniaxial stretching of 5.8 times at 160° C. using a longitudinal stretching machine without removing edge parts. The resultant stretched film was wound as it is in the form of roll without removing edge parts. The resultant film showed heavy waving at the edges, and winding in the form of roll was difficult. In the forcibly wound roll, the remarkable waving at the edges ranged to the center part, resulting in corrugated roll winding. In the case of use of EPC, more significant meandering occurred due to the influence of waving at the edges, generating remarkable winding shift.

The invention claimed is:

1. A method of producing a polarizing layered film, the method comprising:
   a coating step of applying a solution containing a polyvinyl alcohol resin onto one surface of a base material film to form a resin coated layer, and
   a drying step of drying the resin coated layer to form a resin layer,
   wherein in the coating step, un-coated portions on which said solution is not applied are formed in regions each being 0.5 cm or more separated inward from each of the base material film's edges opposing each other along the width direction of the base film,
   wherein the un-coated portions each extend to 20 cm or less inward from each of the opposing edges,
   a removal step of removing un-coated portions from the layered film by cutting a base material film,
   a stretching step of uniaxially stretching the layered film from which the un-coated portions have been removed to obtain a stretched film, and
   a coloring step of coloring a resin layer of the stretched film with a dichroic coloring matter to form a polarizer layer, in this order.

2. The production method of a polarizing layered film according to claim 1, wherein the stretching step includes uniaxial stretching of the layered film in a draw ratio of more than 5.

3. A method of producing a polarizing plate comprising
   a step of preparing a polarizing layered film produced by the production method according to claim 1,
   a laminating step of laminating a protective film to the polarizer layer of the polarizing layered film on the surface opposite to the base material to obtain a multi-layer film, and
   a stripping step of stripping the base material film from the multi-layer film.

4. A method of producing a polarizing plate comprising
   a step of preparing a polarizing layered film produced by the production method according to claim 2,
   a laminating step of laminating a protective film to the polarizer layer of the polarizing layered film on the surface opposite to the base material to obtain a multi-layer film, and
   a stripping step of stripping the base material film from the multi-layer film.

5. A method of producing a polarizing layered film, the method comprising:
   a coating step of applying a solution containing a polyvinyl alcohol resin onto one surface of a base material film to form a resin coated layer, and
   a drying step of drying the resin coated layer to form a resin layer,
   wherein in the coating step, un-coated portions on which said solution is not applied are formed in regions each being 0.5 cm or more separated inward from each of the base material film's edges opposing each other along the width direction of the base film,
   a removal step of removing un-coated portions from the layered film by cutting a base material film,
   a stretching step of uniaxially stretching the layered film from which the un-coated portions have been removed to obtain a stretched film, and
   a coloring step of coloring a resin layer of the stretched film with a dichroic coloring matter to form a polarizer layer, in this order.

6. The production method of a polarizing layered film according to claim 5, wherein the stretching step includes uniaxial stretching of the layered film in a draw ratio of more than 5.

7. A method of producing a polarizing plate comprising
   a step of preparing a polarizing layered film produced by the production method according to claim 5,
   a laminating step of laminating a protective film to the polarizer layer of the polarizing layered film on the surface opposite to the base material to obtain a multi-layer film, and
   a stripping step of stripping the base material film from the multi-layer film.

8. A method of producing a polarizing plate comprising
   a step of preparing a polarizing layered film produced by the production method according to claim 6,
   a laminating step of laminating a protective film to the polarizer layer of the polarizing layered film on the surface opposite to the base material to obtain a multi-layer film, and
   a stripping step of stripping the base material film from the multi-layer film.

9. A method of producing a polarizing laminate film, the method comprising:
- a coating step of applying a solution containing a polyvinyl alcohol resin onto one surface of a base material film to form a resin coated layer, and
- a drying step of drying the resin coated layer to form a resin layer,
- wherein in the coating step, un-coated portions on which said solution is not applied are formed in regions each being 0.5 cm or more separated inward from each of the base material film's edges opposing each other along the width direction of the base film,
- a stretching step of uniaxially stretching the layered film to obtain a stretched film,
- a removal step of removing un-coated portions from the stretched film by cutting a base material film, and
- a coloring step of coloring a resin layer of the layered film from which the un-coated portions have been removed with a dichroic coloring matter to form a polarizer layer, in this order.

10. The production method of a polarizing layered film according to claim 9, wherein the stretching step includes uniaxial stretching of the layered film in a draw ratio of more than 5.

11. A method of producing a polarizing plate comprising
- a step of preparing a polarizing layered film produced by the production method according to claim 9,
- a laminating step of laminating a protective film to the polarizer layer of the polarizing layered film on the surface opposite to the base material to obtain a multi-layer film, and
- a stripping step of stripping the base material film from the multi-layer film.

12. A method of producing a polarizing plate comprising
- a step of preparing a polarizing layered film produced by the production method according to claim 10,
- a laminating step of laminating a protective film to the polarizer layer of the polarizing layered film on the surface opposite to the base material to obtain a multi-layer film, and
- a stripping step of stripping the base material film from the multi-layer film.

13. A method of producing a polarizing laminate film, the method comprising;
- a coating step of applying a solution containing a polyvinyl alcohol resin onto one surface of a base material film to form a resin coated layer, and
- a drying step of drying the resin coated layer to form a resin layer,
- wherein in the coating step, un-coated portions on which said solution is not applied are formed in regions each being 0.5 cm or more separated inward from each of the base material film's edges opposing each other along the width direction of the base film,
- wherein the un-coated portions each extend to 20 cm or less inward from each of the opposing edges,
- a stretching step of uniaxially stretching the layered film to obtain a stretched film,
- a removal step of removing un-coated portions from the stretched film by cutting a base material film, and
- a coloring step of coloring a resin layer of the layered film from which the un-coated portions have been removed with a dichroic coloring matter to form a polarizer layer, in this order.

14. The production method of a polarizing layered film according to claim 13, wherein the stretching step includes uniaxial stretching of the layered film in a draw ratio of more than 5.

15. A method of producing a polarizing plate comprising
- a step of preparing a polarizing layered film produced by the production method according to claim 13,
- a laminating step of laminating a protective film to the polarizer layer of the polarizing layered film on the surface opposite to the base material to obtain a multi-layer film, and
- a stripping step of stripping the base material film from the multi-layer film.

16. A method of producing a polarizing plate comprising a step of preparing a polarizing layered film produced by the production method according to claim 14,
- a laminating step of laminating a protective film to the polarizer layer of the polarizing layered film on the surface opposite to the base material to obtain a multi-layer film, and
- a stripping step of stripping the base material film from the multi-layer film.

* * * * *